United States Patent

[11] 3,603,177

| | | | |
|---|---|---|---|
| [72] | Inventor | Robert C. Burrows | |
| | | P.O. Box 783, Truckee, Calif. 95734 | |
| [21] | Appl. No. | 860,310 | |
| [22] | Filed | Sept. 23, 1969 | |
| [45] | Patented | Sept. 7, 1971 | |

[54] VARIABLE DRIVE RATIO ENGINE TO TRANSMISSION ADAPTER
17 Claims, 6 Drawing Figs.

[52] U.S. Cl. .................................................. 74/745, 74/342
[51] Int. Cl. .................................................. F16h 5/06, F16h 3/22
[50] Field of Search .......................................... 74/745, 342, 344

[56] References Cited
UNITED STATES PATENTS

| | | | |
|---|---|---|---|
| 1,793,482 | 2/1931 | Hendrickson | 180/1.5 X |
| 2,184,198 | 12/1939 | Seeber | 180/1.5 |
| 2,800,028 | 7/1957 | Fergason | 74/745 X |
| 3,133,450 | 5/1964 | Riley, Jr. et al. | 74/342 |
| 3,470,766 | 10/1969 | Hagg et al. | 74/665 |

*Primary Examiner*—Arthur T. McKeon
*Attorneys*—Clarence A. O'Brien and Harvey B. Jacobson ABSTRACT: An engine to transmission adapter plate with integral two speed transmission gearing for disposition between an engine block and an associated transmission housing. The adapter plate not only includes two speed transmission gearing, but also serves to couple an engine output shaft to an associated transmission input or clutch shaft with the engine output shaft upwardly displaced relative to the transmission shaft center axis with which it is customarily coaxial, thereby increasing engine-to-ground clearance of the associated vehicle.

PATENTED SEP 7 1971 3,603,177

Robert C. Burrows
INVENTOR.

BY *Clarence A. O'Brien*
and *Harvey B. Jacobson*
Attorneys

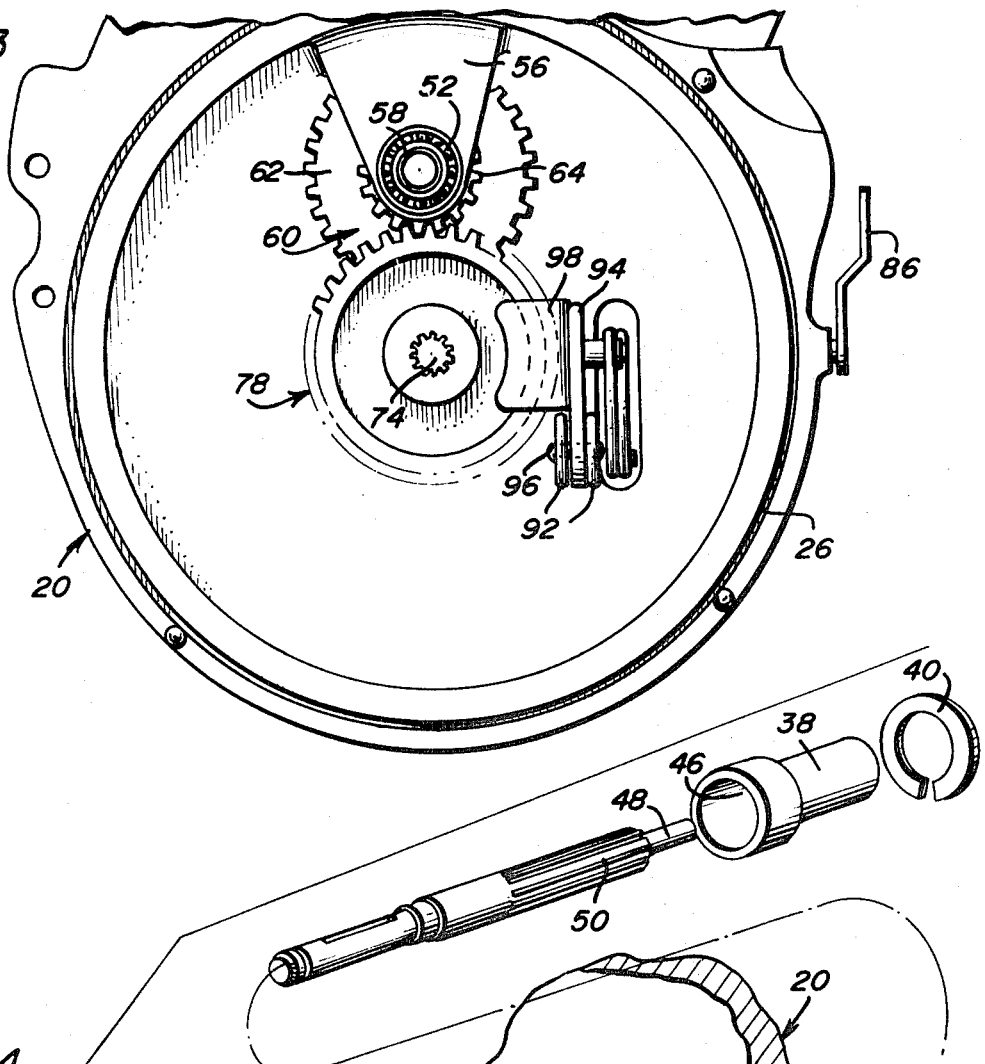
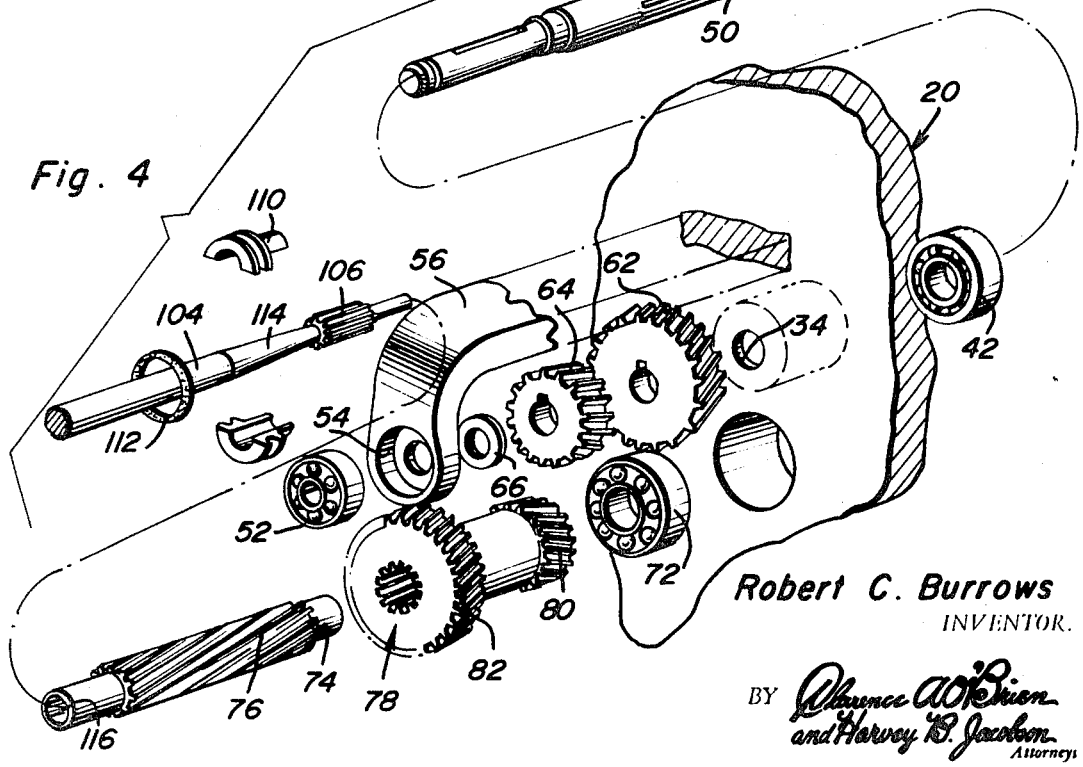

Robert C. Burrows
INVENTOR.

VARIABLE DRIVE RATIO ENGINE TO TRANSMISSION ADAPTER

The engine-to-transmission adapter plate of the instant invention has been designed to provide a means whereby vehicles operated both on roads and rough ground terrain may be provided with means whereby the transmission gearing of the vehicle may be selectively lowered (raised numerically) during operation of the associated vehicle over rough ground terrain.

The "Dune buggy" vehicle is becoming increasingly popular in that it is a relatively inexpensive vehicle which may be operated at a low cost for short trips over roadways and may also be utilized for movement over rough terrain. The most popular form of "Dune buggy" is based upon a shortened Volkswagen chassis and utilizes, in most cases, a one-piece fiberglass body of the roadster-type in lieu of the conventional Volkswagen sedan body. In addition, large dimension flotation-type tires are fitted to the wheels of the chassis not only to increase traction of the rear driving wheels but also to increase ground clearance and enable the "Dune buggy" to travel over soft ground surfaces such as sand without being bogged down.

By increasing ground clearance the "Dune buggy" may move over relatively rough terrain. However, the "departure angle" at the rear of the "Dune buggy" is limited by the rearward placement of the Volkswagen or other engine being utilized rearward of the rear wheels of the "Dune buggy." Accordingly, while there is little forward overhang of the body of a "Dune buggy" forward of the front wheel thereof and the wheel base of the "Dune buggy" is shortened relative to the conventional wheel base of a Volkswagen sedan thus enabling the front and midportions of a "Dune buggy" to travel over quite rough terrain without any portion of the chassis or body contacting the ground, the rearward placement of the engine of a "Dune buggy" does limit the severity of rough terrain over which a "Dune buggy" may pass. However, the engine-to-transmission adapter plate of the instant invention is further novel in that it is interposed between the engine and transmission housings of the "Dune buggy" which are normally bolted together and includes a shiftable two-speed transmission gear train whose input shaft is elevated relative to its output shaft, whereby when the adapter plate is utilized, the engine coupled to the Volkswagen axle and transmission housing is elevated relative to the normal positioning of the engine. This elevation of the engine results in greater engine-to-ground clearance at the rear end of its associated "Dune buggy" and therefor a greater departure angle is realized thus enabling not only the front and midportions of the "Dune buggy" to travel over rough terrain without the chassis or body portions of the "Dune buggy" striking the ground but also the rear portion of the "Dune buggy" to move over rough terrain.

A third feature of the engine-to-transmission adapter plate of the instant invention is that a simplified form thereof may be utilized to couple a Corvair engine to a Volkswagen axle and transmission housing with there being no need to reverse the ring gear in the Volkswagen differential in order to compensate for the fact that the crankshaft of a Corvair engine rotates in a direction opposite to rotation of a Volkswagen engine. Furthermore, a modified form of the engine-to-transmission adapter plate of the instant invention which is only slightly more complex utilizes an additional gear whereby a Volkswagen engine may be utilized in conjunction with the adapter plate while still maintaining continuity of the direction of rotation of the output shaft of the adapter plate gearing and the associated Volkswagen transmission input or clutch shaft.

The main object of this invention is to provide an engine-to-transmission adapter plate for a vehicle to be driven part of the time on improved roads and part of the time over rough terrain with the adapter plate including integral and shiftable two-speed transmission gearing providing numerically low transmission ratios for over-the-road travel and relatively numerically high transmission ratios for travel over rough terrain.

A further object of this invention is to provide an engine-to-transmission adapter plate in accordance with the immediately preceding object and including means by which engines having crankshaft rotation opposite to the desired direction of rotation of a transmission input shaft with which the engine is to be coupled may be effectively coupled to the associated transmission input shaft through the adapter plate with the continuity of the direction of rotation of the transmission input shaft being maintained.

STill another object of this invention is to provide an engine-to-transmission adapter plate in accordance with the preceding objects and which will be operative to upwardly displace an associated engine relative to the corresponding transmission to which the engine is coupled through the adapter plate.

A final object of this invention to be specially enumerated herein is to provide an engine-to-transmission adapter plate which will conform to conventional forms of manufacture, be of simple construction and easy to install so as to provide a device that will be economically feasible, long lasting and relatively trouble-free in an installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational schematic view of a "Dune buggy"-type of vehicle with the adapter plate of the instant invention interposed between the engine of the "Dune buggy" and the transmission and differential housing of the "Dune buggy" and illustrating the manner in which the centerline of the crankshaft of the engine is elevated above the centerline of the input shaft of the transmission;

FIG. 3 is a fragmentary elevational view of the adapter plate as seen from the transmission side thereof;

FIG. 4 is an exploded perspective view of the working components of the adapter plate exclusive of the gear change controls therefor;

Figure 1:
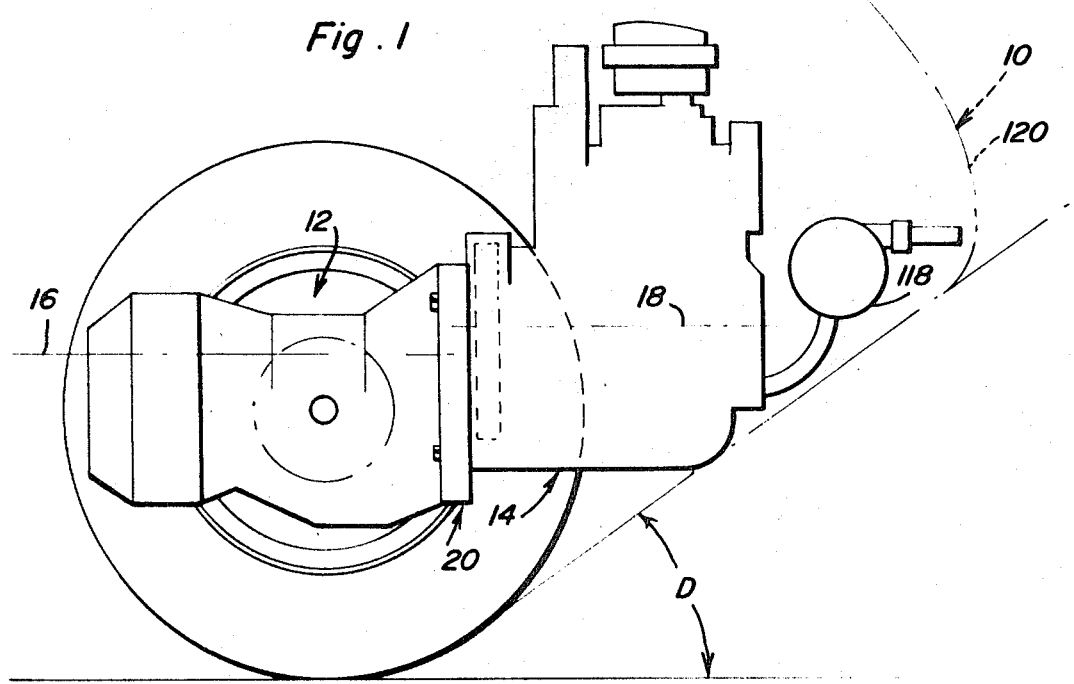

Referring now more specifically to the drawings, the numeral 10 generally designates a "Dune buggy"-type of vehicle including a Volkswagen transmission and differential housing 12 and a Volkswagen engine referred to in general by the reference numeral 14. The input shaft or clutch shaft of the transmission 12 is positioned on the centerline 16 and the crankshaft of the engine 14 is positioned on the centerline 28. Conventionally, the engine 14 is bolted to the housing 12 with the centerlines 16 and 18 in alignment. However, when the adapter plate of the instant invention which is referred to in general by the reference numeral 20 is used, the centerline 18 of the engine 14 is elevated relative to the centerline 16 of the clutch or transmission input shaft, as will be hereinafter more fully set forth.

Figure 2:
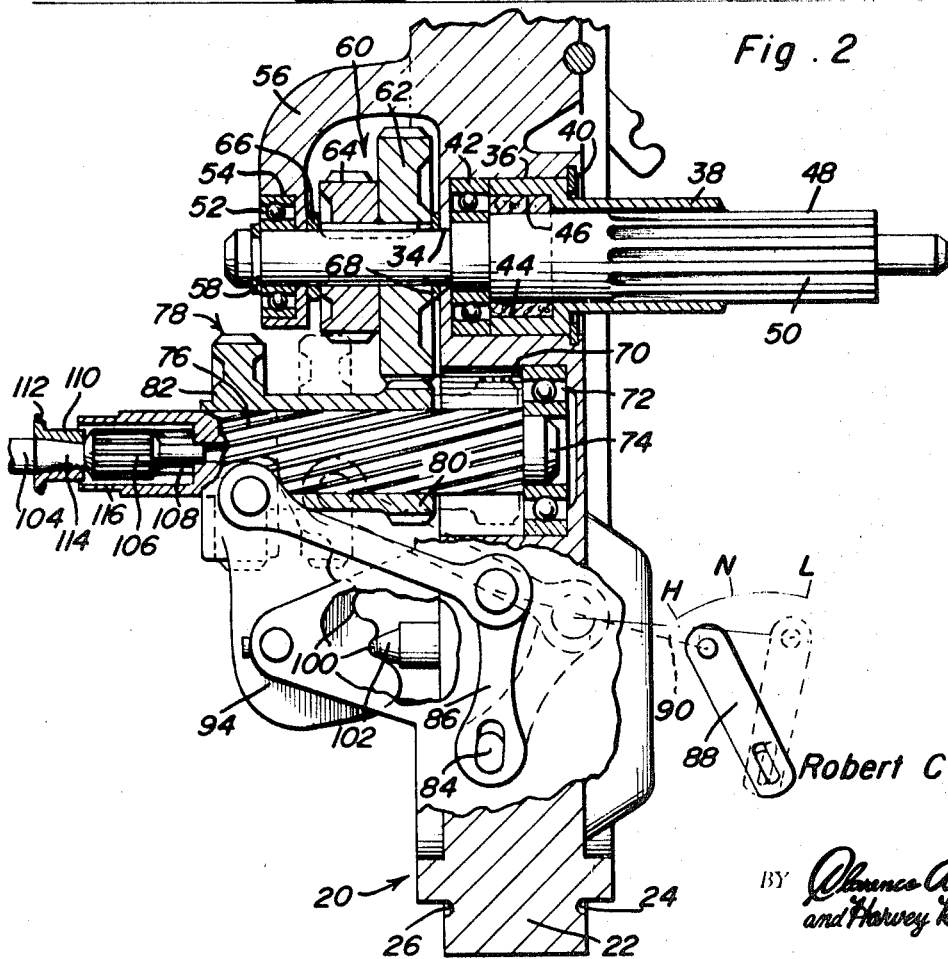
FIG. 2 is an enlarged fragmentary vertical sectional view taken substantially upon a plane passing through the transverse center of the adapter plate.
Figure 5:
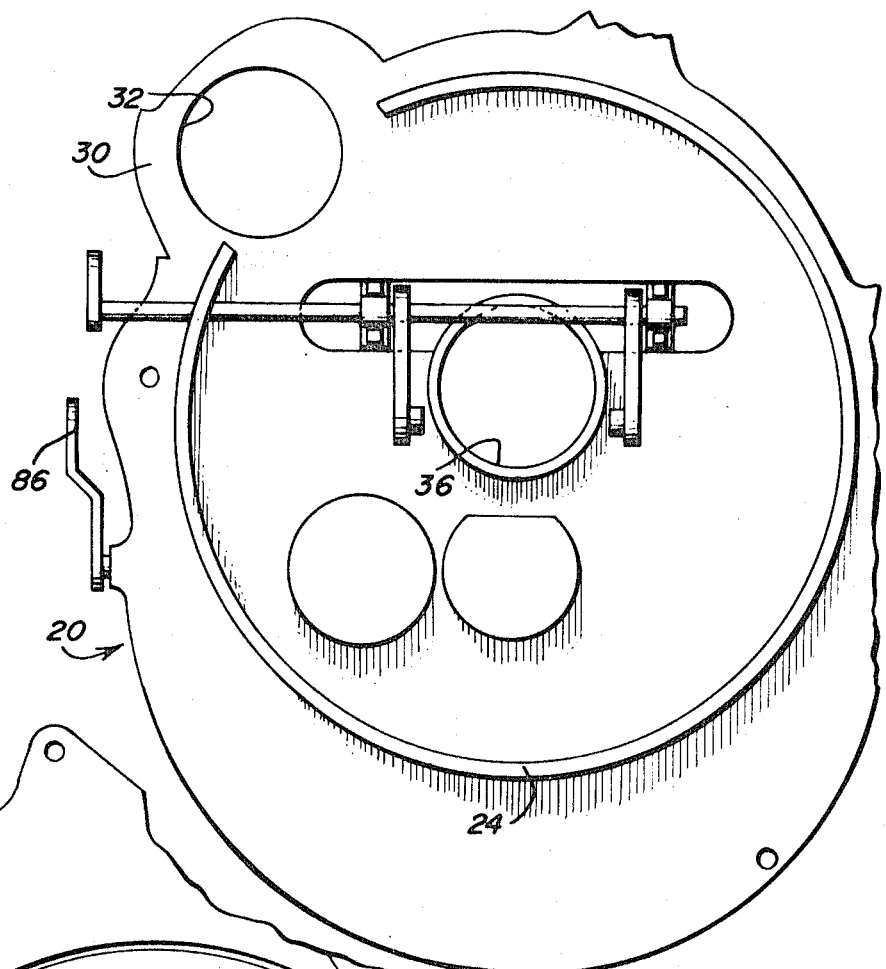
FIG. 5 is a fragmentary elevational view of the adapter plate as seen from the engine side thereof.

With attention now invited more specifically to FIGS. 2–4 of the drawings, it may be seen that the adapter plate 20 includes a platelike body 22 for disposition between the engine 14 and the transmission and differential housing 12. The body 22 includes peripheral opposite side grooves 24 and 26 for the reception of O-ring seals whereby a fluidtight connection may be maintained between the engine 14 and the body 22 and the transmission housing and the body 22. Also, the body 22 includes opposite side outwardly projecting threaded mounting studs (not shown) by which the engine and transmission housings may be secured to the corresponding sides of the body 22.

The adapter plate 20 may be readily interposed between the engine 14 and the transmission and differential housing or assembly 12 in that all original engine, clutch and transmission components are utilized when the adapter plate 20 is used. Further, the adapter plate includes a starter mounting portion 30 having an opening 32 formed therein whereby the original starter may be utilized without need for a special starter ring adapter.

The body 22 includes an upper bore 34 formed therethrough including a diametrically enlarged counterbore 35 in which a clutch release bearing shaft 38 is retained by means of counterbore snap ring 40. A bearing 42 is seated in the counterbore 36 inwardly of the clutch release bearing shaft 38 and an oil seal 44 is disposed in a counterbore 46 formed in the inner end of the clutch release bearing shaft 38. A main drive shaft 48 is provided and is journaled through the clutch release bearing shaft 38 as well as the bearing 42. The input end of he shaft 48 is externally splined as at 50 and the output end of the shaft 48 is journaled by means of a bearing 52 mounted in a counterbore 54 formed in a bearing support 56 carried by the side of the body 22 from which the output end of the shaft 50 projects. A snap ring 58 is provided and engaged with the shaft 48 to limit axial shifting to the right as viewed in FIG. 2 of the drawings.

A cluster assembly referred to in general by the reference numeral 60 including a high speed gear wheel 62 and a low speed gear wheel 64 is keyed to the output end of the shaft 48 between the bearing mount 56 and the body 22. A brass bushing 66 is provided on the shaft 48 intermediate the bearing mount 56 and the cluster gear 60 and a second brass bushing 68 is provided on the shaft 48 between the cluster gear 60 and the adjacent transmission side face of the body 22.

The body 22 includes a blind bore 70 formed therein which opens outwardly of the transmission side of the body 22 and has a bearing 72 seated therein. The bearing 72 rotatably journals the inner end of the sliding cluster gear shaft 74 and the shaft 74 is externally splined as at 76 and has an internally splined cluster gear assembly referred to in general by the reference numeral 78 slidably mounted thereon. The cluster gear assembly 78 includes a small gear wheel portion 80 and a large gear wheel portion 82. The gear wheel portions 80 and 82 are axially spaced apart a distance greater than the axial extent of the cluster gear assembly 60 and it may be seen from FIG. 2 of the drawings that the cluster gear assembly 78 may be shifted axially along the shaft 74 between a first position such as that illustrated in solid lines in FIG. 2 of the drawings with the small gear wheel portion 80 meshed with the high-speed gear wheel 62 and the second phantom line position illustrated in FIG. 2 with the low-speed gear wheel 64 meshed with the gear wheel portion 82.

A shifting shaft 84 is oscillatably supported from the body 22 and includes an outer lever 86 mounted on its outer end which may be suitably connected to an oscillatable control lever 88 by means of a connecting link 90, see FIG. 2. The control lever 88 may be positioned in any desired location and operated by any suitable controlling structure.

The transmission side of the body 22 includes a pair of outwardly projecting mounting ears 92 between which one end of a shifting interlock plate 94 is oscillatably supported by means of a suitable pivot fastener 96. The free end of the shifting interlock plate 94 oscillatably supports a shifting fork 98 therefrom and the shifting fork 98 embracingly engages the gear wheel portion 82. In addition, from FIG. 2 of the drawings it may be seen that the shifting interlock plate 94 includes a plurality of detent notches 100 with which a spring-urged detent 102 is operably associated for releasably retaining the shifting interlock plate 94 in a selected position of three predetermined positions. When the shifting interlock plate 94 is in one limit position the shafting fork 98 positions the cluster gear assembly 78 in the solid line position thereof illustrated in FIG. 2 of the drawings with the gear wheel portion 80 meshed with the high-speed gear wheel 62. When the shifting interlock plate 94 is in the other limit position, illustrated in phantom lines in FIG. 2 of the drawings, the shifting fork 98 positions the cluster gear assembly 78 with the low-speed gear wheel 64 meshed with the gear wheel portion 82. Finally, when the shifting interlock plate 94 is positioned in its intermediate position, the shifting fork 98 positions the cluster gear assembly 78 intermediate the solid and phantom line positions thereof illustrated in FIG. 2 of the drawings whereby both the gear wheels 62 and 64 will be out of mesh with the cluster gear assembly 78.

It will be noted that the shaft 48, when the adapter plate 20 is mounted between the engine 14 and the housing 12, is aligned with the centerline 18 and that the shaft 74 is aligned with the centerline 16. Accordingly, the placement of the adapter plate 20 between the engine 14 and the transmission and differential housing 12 results in the engine 14 being elevated relative to the housing 12.

From FIG. 2 of the drawings it may be seen that the main drive shaft or input shaft 104 of the transmission and differential housing 12 includes a splined end portion 106 which is slidingly received in the internal splined portion 108 of the shaft 74. In addition, a split sleeve 110, whose halves are held together by means of an O-ring 112, is mounted on a tapered portion 114 of the shaft 104 for reception and expansion in the smooth outer end portion 116 of the output end of the shaft 74. As the flange on the split sleeve 110 abuts the opposing end of the shaft 74 upon movement of the shaft 104 toward the engine side of the body 22, the sleeve 110 is expanded into tight engagement with the internal surfaces of the smooth portion 116 and thus the adjacent ends of the shafts 74 and 104 are supported from each other.

As can be seen form FIG. 1 of the drawings, inasmuch as the engine 14 has been elevated by the placement of the adapter plate 20 between the engine 14 and the transmission and differential housing 12, the departure angle D is greater than it would be if the engine 14 were lowered to its original position relative to the housing 12. Further, the exhaust system 118 of the vehicle 10 is constructed in a manner whereby it will lie outside the departure angle D and the abbreviated body 120 of the vehicle 10 also lies outside the departure angle D. Therefore, it may be seen that the vehicle 10 having the adapter plate 20 interposed between the engine 14 and the transmission housing 12 has increased ground clearance at the rear. Further, the control lever 88 may be shifted as desired in order to drive the input shaft of the transmission in either high or low gear ratio relative to the speed of the crankshaft of the engine 14.

When the adapter plate 20 is utilized between the Volkswagen engine 14 and the Volkswagen transmission and differential housing 12, inasmuch as the output shaft 74 rotates in reverse relative to the direction of rotation of the input shaft 48, the ring gear of the Volkswagen must be reversed. However, when the engine 14 comprises a Corvair engine which may also be mated to the housing 12, inasmuch as the Corvair engine crankshaft rotates in a direction opposite to the direction of rotation of a Volkswagen engine, utilization of the adapter plate 10 between the Corvair engine 14 and the housing 12 automatically reverses the rotation of the shaft 74 for proper rotation for use with the Volkswagen transmission and differential.

Figure 6:
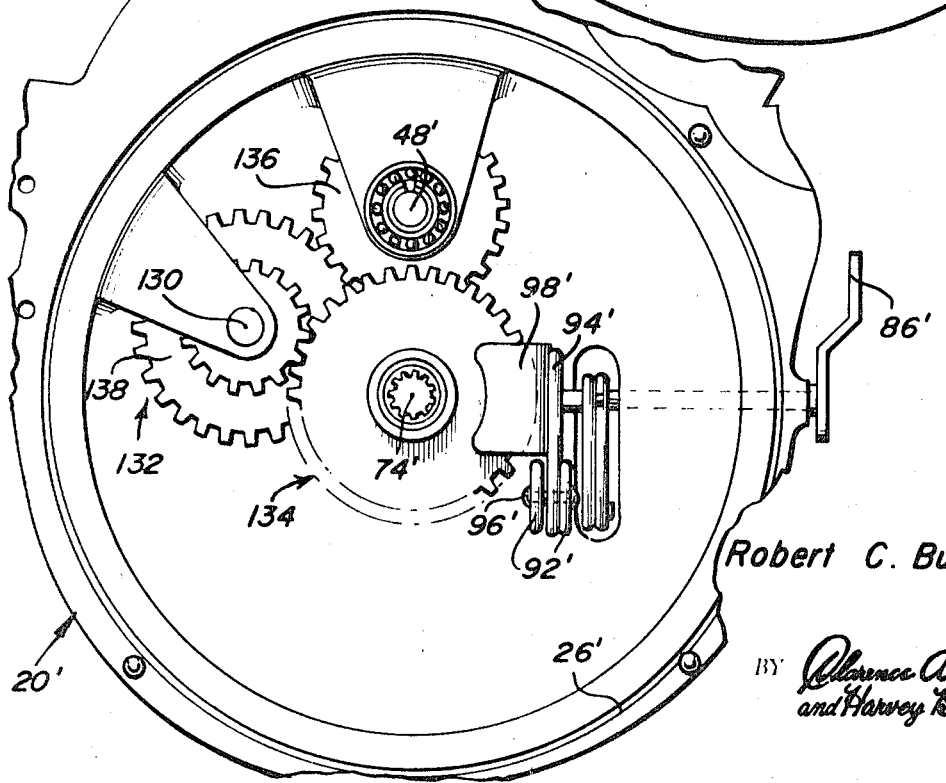
FIG. 6 is an elevational view similar to FIG. 3 but illustrating a modified form of adapter plate utilized to couple a Volkswagen engine to a Volkswagen differential and transmission housing while maintaining continuity between the crankshaft and clutch input shaft directions of rotation.

With attention now invited more specifically to FIG. 6 of the drawings there may be seen a modified form of adapter plate generally referred to by the reference numeral 20' and which is basically similar to the adapter plate 20. Accordingly, components of the adapter plate 20' corresponding to similar components of the adapter plate 20 have been given corresponding prime reference numerals. However, the difference between the adapter plate 20' and the adapter plate 20 resides in the provision of an intermediate shaft 130 on the plate 20' from which a cluster gear referred to in general by the reference numeral 132 is journaled. The cluster gear 132 corresponds to the cluster gear 60 and is keyed to the shaft 130 in a similar manner. The adapter plate 20' further includes a cluster gear assembly 135 which corresponds to the cluster gear assembly 78 and is shifted axially by the shifting fork 98'. However, the shaft 48' corresponding to the shaft 48 is journaled from the adapter plate 20' in a similar manner but has a single gear wheel 136 keyed thereon and meshed with the large gear wheel 138 of the cluster gear 132 corresponding to the high-speed gear wheel 62 of the cluster gear 60.

Accordingly, the shaft 74' of the adapter plate 20' which corresponds to the shaft 74 of the adapter plate 20 rotates in the same direction as the shaft 48'. Therefore, the adapter plate 20' may be interposed between the engine 14 and the housing 12 when the engine 14 comprises a Volkswagen engine without the necessity of having to reverse the ring gear within the housing 12. Further, it will be noted that the adapter plates can be utilized on many front engine vehicles as well as various pieces of heavy equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling which the scope of the invention.

I claim:

1. An engine-to-transmission adapter plate for disposition and support between an engine block and an associated transmission case, said plate including first and second shaft portions journaled for rotation about parallel spaced apart axes, drive means drivingly connecting said first shaft portion to said second shaft portion and said first shaft portion including means for driving the first shaft portion from an engine shaft and said second shaft portion including means for driving a clutch shaft, said second shaft portion projecting from the transmission side of said plate and includes a splined center bore into which said clutch shaft may be telescoped, said splined bore including a smooth outer end counterbore adapted to snugly receive a split bushing carried by said clutch shaft therein.

2. The combination of claim 1 wherein said drive means drivingly connecting the first shaft portion of the second shaft portion includes two speed transmission gearing operable to selectively drive said second shaft portion at two different speeds in response to rotation of said first shaft portion at a predetermined speed.

3. The combination of claim 1 wherein said drive means includes means operative to drive said second shaft portion in a direction opposite to the direction of rotation of said first shaft portion.

4. The combination of claim 1 wherein said drive means includes means operative to drive said second shaft portion in a direction the same as the direction of rotation of said first shaft portion.

5. The combination of claim 1 wherein said drive means comprises meshed gears on said shaft portions.

6. The combination of claim 1 wherein said drive means comprises meshed gears on said shaft portions, said first and second shaft portions being generally horizontally disposed with said first shaft portion spaced above said second shaft portion.

7. The method of increasing engine-to-ground clearance in a motor vehicle of the type including a motor to which a transmission is removably secured with the output shaft portion of the motor generally paralleling in predetermined elevation relative to and drivingly coupled to the input shaft portion of the transmission, said method including the steps of separating the engine and transmission along a path paralleling said shaft portions, elevating the motor relative to the transmission, and interposing and securing an adapter and spacing plate between the engine and transmission including drive train means drivingly coupling said output shaft portion to said input shaft portion.

8. The method of claim 7 wherein the step of interposing and securing an adapter and spacing plate between the engine and transmission includes the step of introducing selectable ratio two speed gear drive train means between said engine output shaft portion and said transmission input shaft portion.

9. The method of claim 7 wherein the step of interposing and securing an adapter and spacing plate between the engine and transmission includes the step of introducing drive train means between said engine output shaft portion and said transmission input shaft portion for driving the input shaft portion in the same direction of rotation in which the output shaft portion is rotating.

10. The method of claim 7 wherein the step of interposing and securing an adapter and spacing plate between the engine and transmission includes the step of introducing drive train means between said engine output shaft portion and said transmission input shaft portion for driving the input shaft portion in the opposite direction of rotation in which the output shaft portion is rotating.

11. The method of claim 7 wherein the step of interposing and securing an adapter and spacing plate between the engine and transmission includes the performance of this step on a gear engine vehicle wherein the engine is spaced rearward of the transmission and the axes of rotation of the rear wheels of the vehicle, whereby the elevation of the engine relative to the transmission will increase the maximum angle of departure determined by a line tangent to and extending upwardly from the rear tread portions of the rear wheels of the vehicle and intersecting with the lowermost rear portion of the engine.

12. In combination with an engine including an output end and associated output shaft and a transmission having an input end and associated input shaft and wherein, conventionally, said shafts are aligned, said ends are secured together and said output shaft drives said input shaft, an engine-to-transmission adapter plate interposed between said engine and transmission output and input ends and to which the latter are secured with said output shaft elevated above said input shaft, said adapter plate including drive train means drivingly coupling said output shaft to said input shaft.

13. The combination of claim 12 wherein said drive train means includes shiftable two speed transmission means for selectively driving said input shaft at two ratios from said input shaft.

14. The combination of claim 12 wherein said drive train means includes means operative to drive said output shaft in a direction opposite to the direction of rotation of said input shaft.

15. In combination with a transmission including engine input and transmission output ends having input and output shafts, respectively, and with said input end including means for securing the output end of an engine thereto with the engine output shaft being drivingly coupled to the transmission input shaft and rotating in a first direction, an engine conversion assembly including a replacement engine having an output shaft rotatable in the opposite direction, an engine-to-transmission adapter plate having one side mounted on said input end and said replacement engine mounted on the other side, said adapter plate including drive train means drivingly coupling said replacement engine output shaft to said transmission input shaft with said input shaft rotating in the direction opposite to the direction of rotation of the replacement engine output shaft.

16. The combination of claim 15 wherein said drive train means includes two speed transmission gearing operable to drive said input shaft at two different speeds in response to rotation of said replacement engine shaft at a predetermined speed.

17. The method of operably coupling a replacement engine of the type including an output shaft portion rotatable in a first direction to a vehicle transmission conventionally having an engine including an output shaft portion rotatable in the opposite direction secured thereto with the output shaft portion of the conventional engine driving the transmission input shaft portion in said opposite direction, said method including the steps of securing opposite sides of an adapter and spacing plate, of the type including drive train means having at least an input shaft and an output shaft with the former driving the latter for rotation reverse to the rotation of the former, to said transmission and replacement engine with said output shaft portion driving said input shaft in the same direction of rotation as said output shaft portion and said output shaft driving said input shaft portion in the same direction of rotation as said output shaft.